No. 644,590. Patented Mar. 6, 1900.
H. A. FRANTZ.
MOTOR VEHICLE.
(Application filed May 23, 1899.)
(No Model.) 5 Sheets—Sheet 5.
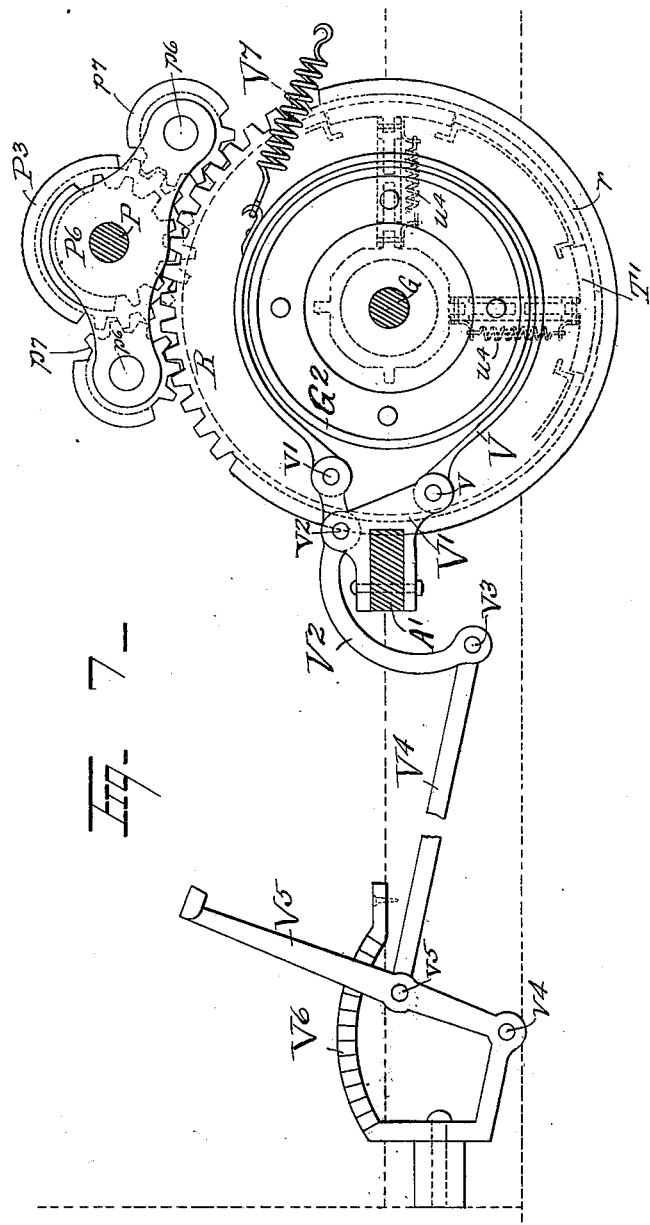
Witnesses
Inventor
Hiram A Frantz
by
Attorney

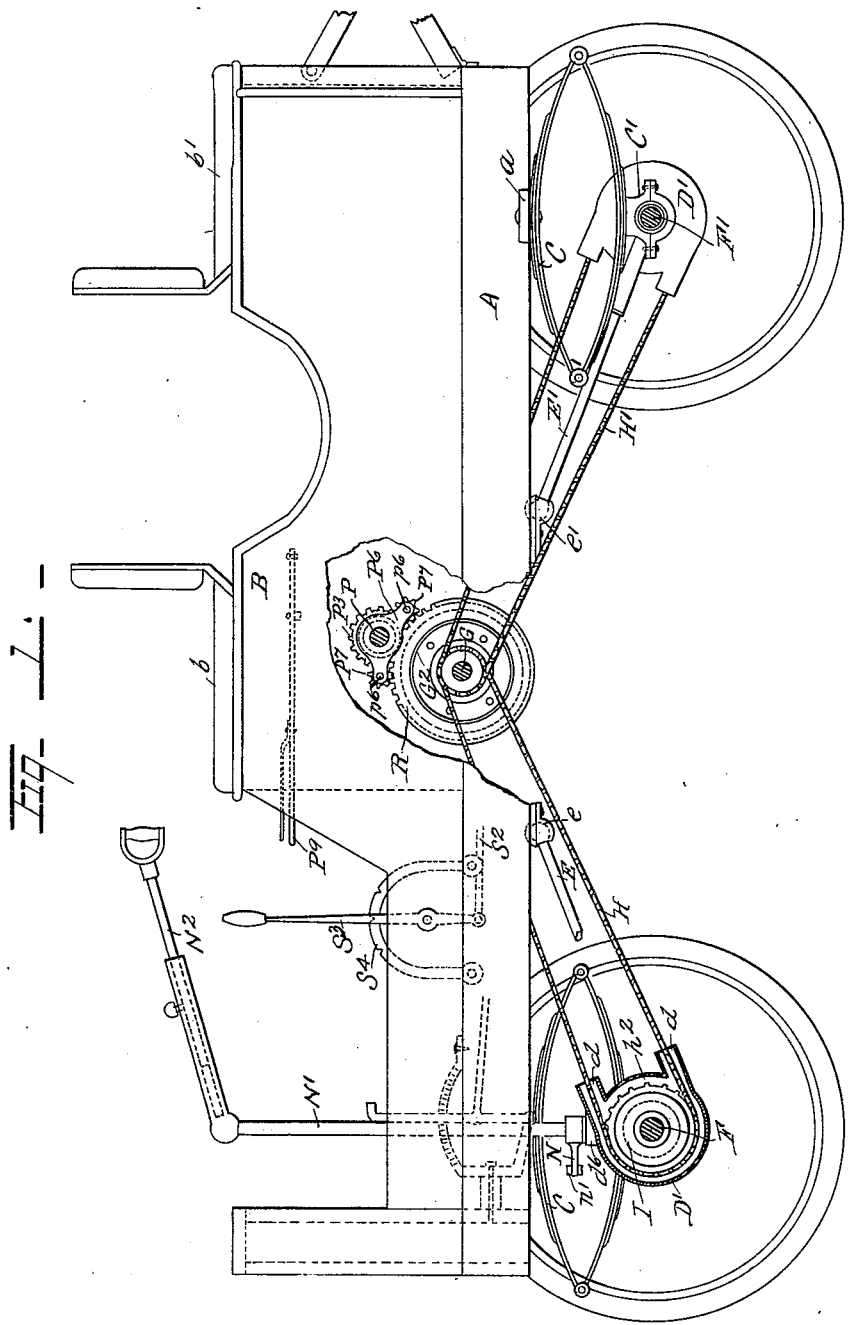

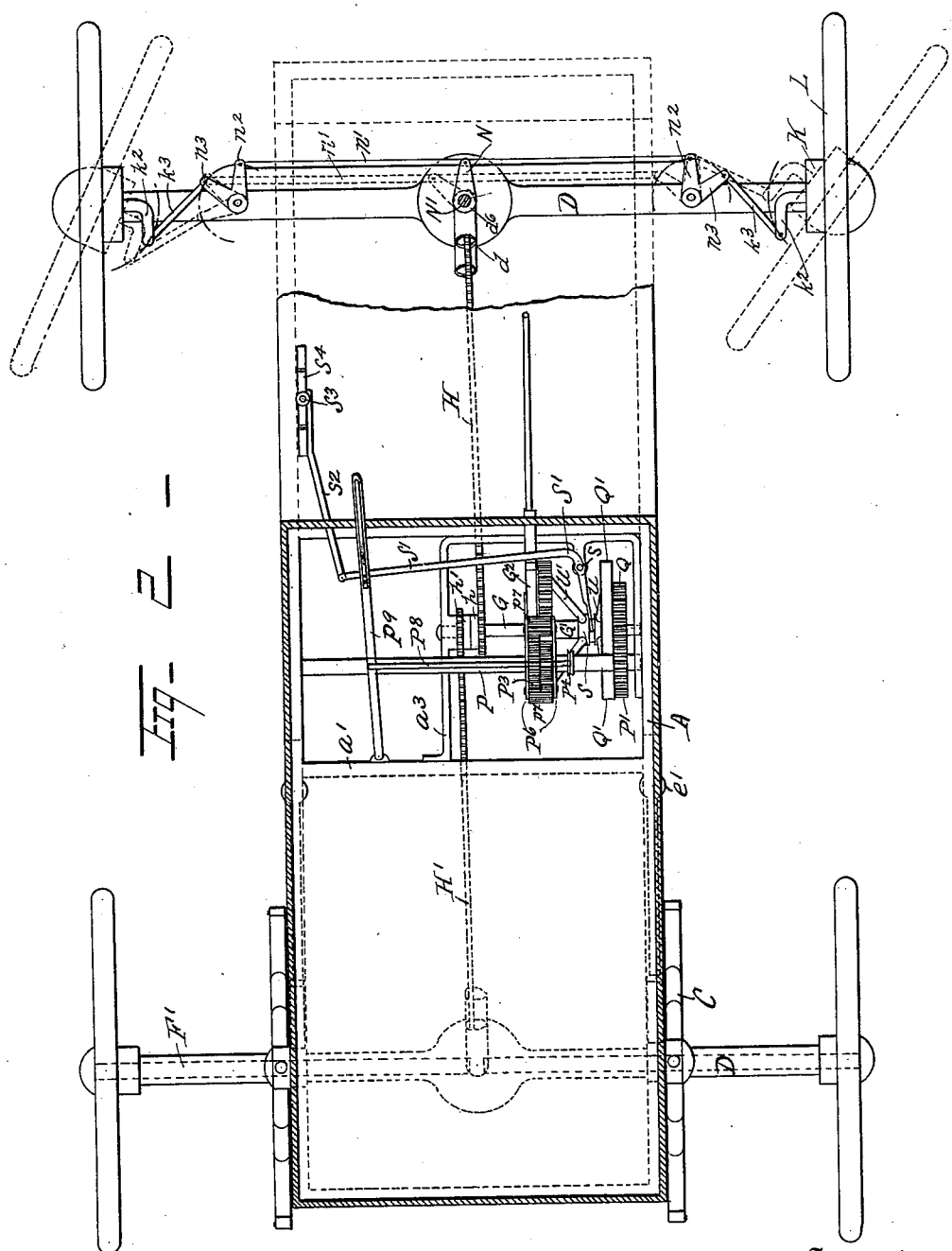

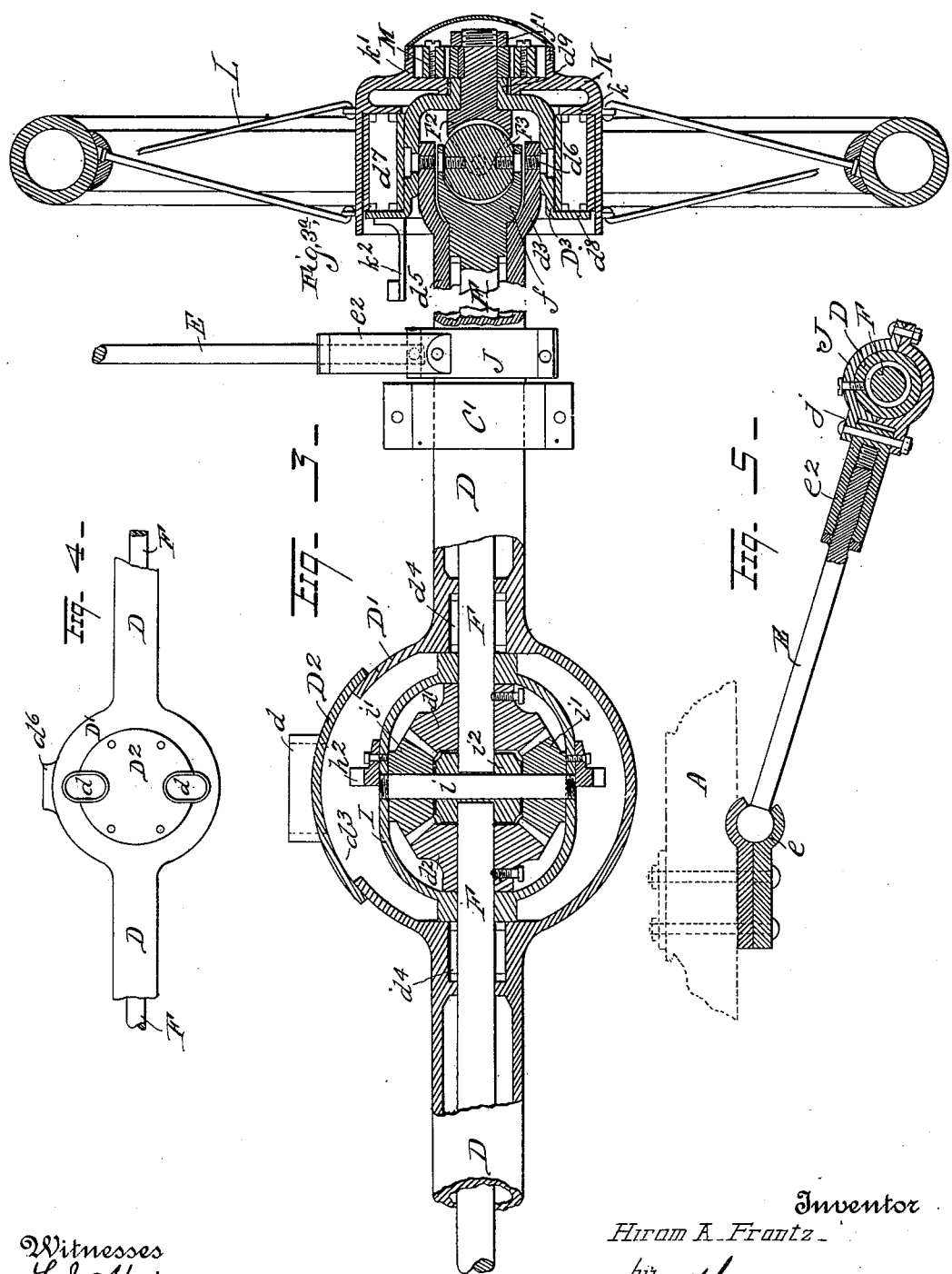

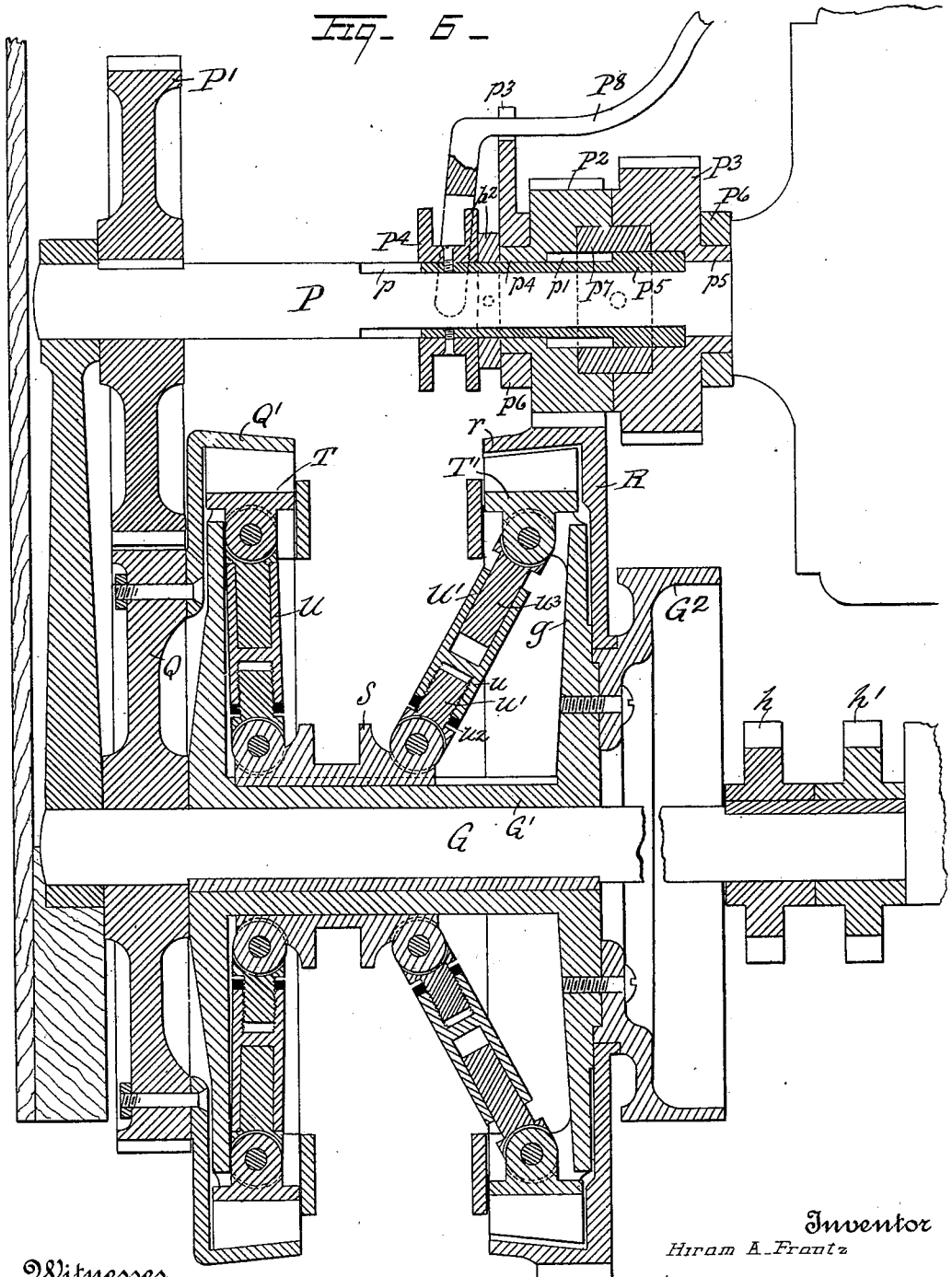

UNITED STATES PATENT OFFICE.

HIRAM A. FRANTZ, OF TAMAQUA, PENNSYLVANIA, ASSIGNOR OF ONE-HALF TO ELMER E. BRODE, OF SAME PLACE.

MOTOR-VEHICLE.

SPECIFICATION forming part of Letters Patent No. 644,590, dated March 6, 1900.

Application filed May 23, 1899. Serial No. 717,884. (No model.)

*To all whom it may concern:*

Be it known that I, HIRAM A. FRANTZ, a citizen of the United States of America, and a resident of Tamaqua, in the county of Schuylkill and State of Pennsylvania, have invented certain new and useful Improvements in Motor-Vehicles, of which the following is a specification.

My invention relates to certain improvements in motor-vehicles, and more particularly to that class shown and described in my pending applications, Serial Nos. 704,945 and 704,946, filed February 8, 1899.

My present improvements are fully described in connection with the accompanying drawings and are specifically pointed out in the claims.

Figure 1 is a side view, partly in section, of a machine embodying my improvements. Fig. 2 is a plan view of the same, partly in section. Fig. 3 is a horizontal sectional view of the axle-casing and differential gear, and Fig. 3$^A$ is a vertical sectional view of one of the front wheels and its connection to the axle and casing. Figs. 4, 5, 6, and 7 show various parts in detail.

A represents the body or frame of the vehicle, which is carried on bolsters $a$, secured to springs C, which latter are carried upon seats C', loosely secured to the sleeves or casings D, inclosing the axles F F'. These axle-casings are further connected with the rigid frame A of the machine by means of front and rear radius-bars E E', which are pivotally secured to socket-bearings $e$ and $e'$, respectively, on the frame and connected to the axle-casing D, as shown, by means of a screw-sleeve $e^2$, hinged at $j$ to a collar J, firmly secured thereto. The axes of these radius-bars converge approximately toward the intermediately-located transverse shaft G, from which motion is transmitted to the axles F F', as will be hereinafter described. It will be noticed that this manner of connecting the axles to the frame A allows for convenient adjustment and also for both lateral and vertical movement of the body without materially changing the distance of either axle from the shaft G, the movement of the axles relative to the frame being controlled by the radius-bars E E', so as to swing in arcs practically coincident through the range of movement required with those having the shaft G for a center.

The axles F and F', as stated, receive motion from the shaft G, this being effected, as shown, by means of chains H and H' engaging sprocket-wheels $h$ $h'$ on the shaft G and $h^2$ $h^3$ on the front axle and rear axle, respectively. Following the forward chain H to the front axle it will be noticed that the latter is divided at the center into two parts F F', each of which is driven by the chain-wheel $h^2$ through bevel-gears $i'$ $i'$, loosely mounted on a spindle $i$, which is rotated with the gear-frame I and chain-wheel $h^2$, said loose bevel-gears $i'$ $i'$ engaging with fixed bevel-gears $d'$ $d^2$ on the axle parts F F' and being spaced on the spindle $i$ by a collar $i^2$, into which the abutting ends of the axle parts may extend, as shown. The whole of this gearing and the axle parts themselves are inclosed by a casing D, which is of spherical form at the center, with a suitable opening $d^3$, closed by a cap D$^2$, having chain-openings $d$ $d$, and within the cylindrical portions D of which said axle parts are suitably mounted upon rollers at $d^4$ $d^5$ for rotation therein, the casing itself being secured to the frame of the machine, as shown, by means of the radius-bars E and springs C.

The wheel L is provided with a hollowed-out hub which incloses the pivoted extension D$^3$ of the casing D and rotates thereon upon a series of rollers $d^7$, located between flanges $d^8$ of the casing extension and $k$ of the wheel-hub, the reduced portion $k'$ of which latter bears upon the reduced hub $d^9$ of the casing extension D$^3$, with which the wheel is maintained in alinement when held thereon by means of the axle-nut $f'$. The latter is threaded upon the end extension F$^2$ of the axle F, which is connected, as shown, by a universal joint F$^3$ to the bifurcated end $f$ of the main axle F. A ratchet-and-pawl engagement is provided at M between the axle extension F$^2$ and the hub K of the wheel, which is thus caused to rotate with the axle, while at the same time it is capable of adjustment to any required angle with relation to the main axle and casing for the purpose of steering the vehicle. This steering adjustment of the front wheels is effected by means of a lever mechanism, as indicated in Fig. 2, connecting with the hub K, which is provided with a fixed arm $k^2$, to which the rod $k^3$ of the lever mechanism is attached. The latter comprises an arm N, fixed upon a vertical shaft N', having a step-bearing in a boss $d^6$ on the spherical portion D' of the axle-casing and extending upward through the floor of the vehicle-body and provided at its upper end with a handle-bar $N^2$, extensibly secured thereto and adapted to be conveniently turned as desired by the operator. The shaft-arm N, as shown, is connected to the middle of a rod $n'$, the opposite ends of which are connected to parallel arms $n^2$ $n^2$ of separate bell-cranks, pivoted to the axle-casing at a suitable distance from each wheel-hub K, with the arms $k^2$ $k^2$ of which the other bell-crank arms $n^3$ $n^3$ are connected by the rods $k^3$, as stated, so that the effect of turning the steering-shaft N' is to swing each of the connected wheels to an angle with the relatively-fixed axle proportioned to the amount of such movement of the shaft and the radius of curve in which it is desired to turn the vehicle from a straight line. As indicated by the dotted positions of the wheels, this angle is greater on the inside wheel than on the outside wheel, as is required by the shorter radius-curve in which it is required to move and the more advanced position of that end of the fixed axle. This difference in angle is due to the relative arrangement of the parts, as shown, whereby the equal movements of the bell-cranks on each side are made more effective in swinging the connected wheel inward (as required on the inside wheel) than it is in swinging the other outward. Owing to the fact that the bell-crank arms $n^3$ $n^3$ move in equal arcs the connected hub-arms $k^2$ $k^2$ are swung a greater distance in one case than in the other, as will be seen on comparison of the corresponding positions indicated by full and dotted lines, respectively, in Fig. 2, and it is obvious that the same differences will result if the wheels be set to turn the vehicle in a reverse curve, the inner wheel being always given a greater angle to the axle than the outer one, as is required.

The rear axle, wheels, and axle-casing are similar in construction to the front, except that the wheels are rigidly secured to the axle, there being no necessity for adjusting them for steering, as in front, and the axles being consequently made in two sections only instead of four and the casing in one section only instead of three, the end sections of the front axle and casing and the universal-joint connection being omitted.

Reverting to the shaft G, from which motion is transmitted to the axles, as described, it will be noticed that it is itself driven from a main shaft P, to which any preferred form of motor (not shown) may be applied. To this shaft P is fixed a gear-wheel P', which meshes with a gear-wheel Q, loosely mounted on the driven shaft G and provided with a rigidly-secured friction-wheel or circular flange Q', through which the motion of the gear-wheel Q may be transmitted to the shaft G by means of a clutch mechanism consisting of a sleeve S, arranged to slide axially upon a flange sleeve G', keyed to the shaft, said sleeve S carrying friction-shoes T, adapted to be pressed into engagement with the friction-wheel extension Q' of the gear-wheel Q, as hereinafter described.

In order to provide for driving the shaft G at a slower speed relative to the main shaft P than is transmitted through the fixed gear-wheel P' and also to provide for reversing the rotation of said shaft G without reversing that of the main shaft, I mount upon the latter a pair of smaller gear-wheels $P^2$ and $P^3$, of somewhat different diameters, arranged contiguously and either of which may be caused to rotate with the shaft P by means of keys $P^5$, feathered to the shaft and movable axially by means of a grooved sleeve $P^4$, to which they are secured, this sleeve $P^4$ being engaged by a rod $P^8$, which is operated by a conveniently-located hand-lever $P^9$, as shown. These keys $P^5$ move loosely in axial grooves provided in a collar $P^7$, which is fixed to the shaft and upon which both of the gear-wheels $P^2$ and $P^3$ are partly mounted, both being recessed from their abutting faces, so as to inclose said collar. Each gear-wheel is also provided on its outer face with a projecting hub $p^4$ or $p^5$, and upon these hubs are loosely mounted parallel plates $P^6$ $P^6$, which extend laterally beyond the gear-wheel $P^3$ and are rigidly connected by axles $p^6$ $p^6$, upon which are loosely carried between the plates pinion-wheels $p^7$ $p^7$, which mesh with the wheel $P^3$ and are also wide enough to mesh at the same time with a gear-wheel R on the shaft G, with which the gear-wheel $P^2$ also meshes. This gear-wheel R, as shown, is loosely mounted upon the flanged sleeve G' and is provided with a circular friction-flange $r$, similar to Q' on the gear-wheel Q, the inner periphery of which is adapted to be engaged by friction-shoes T' in the same manner as the friction wheel or flange Q' is engaged by the shoes T, previously referred to. Each of these two series of friction-shoes T and T' is connected to the clutch-sleeve S by a corresponding series of connecting-rods U or U', each rod being pivoted at one end to a friction-shoe and at the other to the clutch, so as to form a double clutch arranged to operate by means of a single sliding sleeve upon either of the friction-flanges Q' or $r$. Each of these connecting-rods, as shown, is made adjustable as to length by means of a screw-threaded part $u'$, engaging the tubular body $u$ of the rod, and a jam-nut $u^2$ to lock it in adjusted position and is also made extensible under strain by employing a telescope connection between the opposite jaw part $u^3$ and the tubular body, with a spring $u^4$ arranged to keep said parts in engagement. The shoes T T' have a limited radial movement in suitable guideways or pockets formed within the friction-flanges Q' and r, and the effect of moving the sleeve S in either direction from a central position upon the shaft-sleeve G', in which position both of the gear-wheels Q and R are rotated loosely and without effect upon the shaft G, is to produce a frictional engagement between one or other of said gear-wheels and the shaft G. Thus when moved to the position indicated in Fig. 6 a rapid forwardly-rotating movement of said shaft is transmitted through the gear-wheel Q. If moved in the opposite direction, a slower movement is transmitted to the shaft through the gear-wheel R, the direction of which is determined, as already described, by the position of the reversing mechanism $P^4 P^5$. The sleeve S is operated by means of a forked-end lever S', which is pivoted to a fixed point S of the frame and connected by means of a rod $S^2$ to a hand-lever $S^3$, having a locking-quadrant $S^4$.

As a means of braking the machine I provide a brake-wheel extension $G^2$ on the flanged shaft-sleeve G', this being so secured to the flange $g$ of the latter, as shown, as to form a journal-bearing for the friction-flanged gear-wheel R. A brake-band V incloses the wheel $G^2$ and has one end pivoted at $v$ to a frame attachment V' and the other end at $v'$ to the short arm of a lever $V^2$, which is fulcrumed intermediately at $v^2$ to the frame attachment V' and has its long arm connected by a rod $V^4$ to a foot-lever $V^5$, operating upon a locking-quadrant $V^6$, as shown, the lever serving to apply the brake by closing the band upon the brake-wheel $G^2$, while a spring $V^7$ is arranged so as to normally release it from the latter.

It will be noticed that the frictional driving-gear may also be used so as to effectually brake the machine independently of the brake mechanism, the latter being preferably used, however, with the motor entirely out of gear with the shaft G.

Inasmuch as certain features of the construction herein described and shown have been previously set forth and claimed in my pending applications referred to, I make no claim to the same in the present application.

What I claim is—

1. In a motor-vehicle the combination with a frame, of mechanism in said frame for driving said vehicle, flexible means for communicating motion from the driving mechanism to the front and rear axles, springs between said axles and frame and radius-bars connecting said axles and frame.

2. In a motor-vehicle the combination with a frame, of mechanism in said frame for driving said vehicle, flexible means for communicating motion from the driving mechanism to the front and rear axles, casings in which said axles rotate, springs fixed to said frame and to spring-seats mounted on said casings, and radius-bars flexibly connected to said casings and to the frame.

3. In a motor-vehicle the combination with a frame, of mechanism in said frame for driving said vehicle, an axle parted midway of its length and provided with connecting-gear mounted in a rotary frame adapted to rotate said axle parts jointly, and a fixed casing inclosing said axle parts and rotary frame and having bearings for said axle parts.

4. In a motor-vehicle the combination with a rotary axle and a fixed casing therefor, of an end extension of said axle having a universal-joint connection therewith, an extension of said casing pivotally connected thereto, and a wheel secured to said axle extension and mounted upon the pivoted casing extension, said jointed connections of the axle parts and of the casing parts being located in the vertical plane of the wheel-rim.

5. In a motor-vehicle the combination with a rotary axle and a fixed casing inclosing the axle and having bearings therefor, of an extension of said axle having a universal-joint connection therewith, a cylindrical extension of said casing inclosing the end of the main casing, having a pivotal connection thereto, and forming a swinging bearing for said axle extension, a wheel having a hub secured to said rotary axle extension and centrally recessed to loosely inclose said pivoted casing extension, and a circular series of rollers pocketed between said recessed hub and the periphery of the pivoted casing extension, said rollers, pivotal connection and universal-joint connection being all located in the central vertical plane of the wheel-rim.

6. In a motor-vehicle the combination with a rotating axle having pivoted journal ends with wheels mounted thereon and a fixed casing in which the intermediate portion of said axle is rotatively mounted, of a steering mechanism comprising bell-crank levers pivoted to said fixed casing approximately in the vertical axial plane and having the arms thereof projected forward of said plane, a connecting-rod $k^3$ from each of said levers pivoted to a rearwardly-extended wheel-arm $k^2$, and means for simultaneously operating said levers, substantially as set forth.

7. In a motor-vehicle the combination with a frame, of a drive-shaft, a driven shaft from which motion is transmitted to the vehicle-axles, fixed gear-wheels of different diameters carried by said drive-shaft, loose gear-wheels on said driven shaft in mesh with said fixed wheels respectively, friction-wheels carried by said loose gears, and a clutch mechanism carried by the driven shaft comprising a flanged sleeve fixed to said shaft, a clutch-sleeve slidable on said flanged sleeve two series of radially-guided friction-shoes adapted to engage said friction-wheels respectively and spring-compressed telescope connections between said slidable sleeve and each of said series of shoes.

8. In a motor-vehicle having positivelydriven front and rear axles, the combination with a centrally-parted front axle having a differential driving-gear connection, of pivoted end extensions to said axle parts, and wheels having a ratchet connection to said axle extensions substantially as described.

9. In a motor-vehicle the combination with a frame, a drive-shaft, and a driven shaft from which motion is transmitted to the vehicle-axles, of a reversing-gear connection between said shafts comprising a gear-wheel fixable to said driven shaft, two gear-wheels on said drive-shaft one of which meshes directly with said gear-wheel on the driven shaft, a clutch mechanism for engaging one or other of said gear-wheels with the drive-shaft, and an idler gear-wheel arranged in mesh with the second of said drive-shaft gears and also with the driven-shaft gear.

10. In a motor-vehicle the combination with a frame, a drive-shaft, and a driven shaft from which motion is transmitted to the vehicle-axles, of a gear-wheel fixed to said drive-shaft, a flanged sleeve fixed to said driven shaft, a gear-wheel loosely carried by said flanged sleeve and in mesh with said drive-gear, a clutch mechanism between said loose wheel and the driven shaft, a brake-wheel carried by said flanged sleeve, and a brake mechanism comprising a band inclosing said brake-wheel and a lever mechanism carried by the frame and adapted to operate said band.

Signed by me at Tamaqua, Pennsylvania, this 17th day of May, A. D. 1899.

HIRAM A. FRANTZ.

Witnesses:
L. S. FOLLWEILER,
C. S. GILFEST.